May 27, 1941.     G. W. JAMES     2,243,755
APPARATUS FOR TESTING FLUORESCENT LAMPS, CONTROL UNITS, AND CIRCUITS
Filed July 13, 1940     8 Sheets-Sheet 6
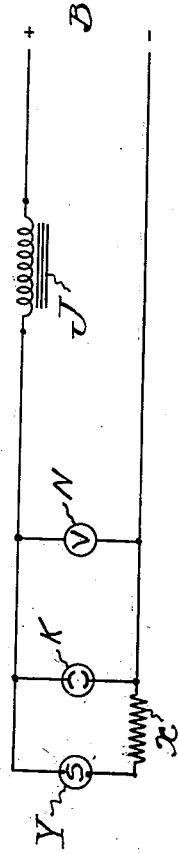
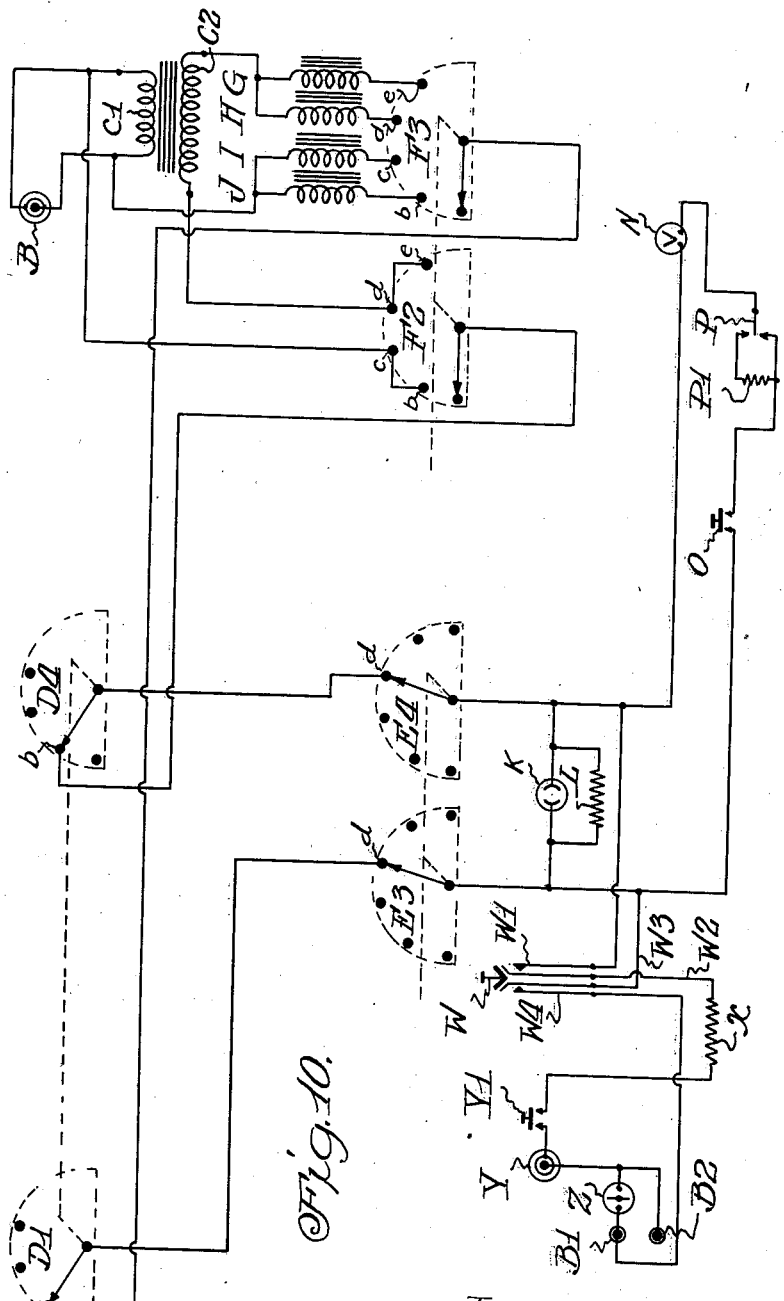
Inventor
Gerald Wayne James
by *His Attorney.*

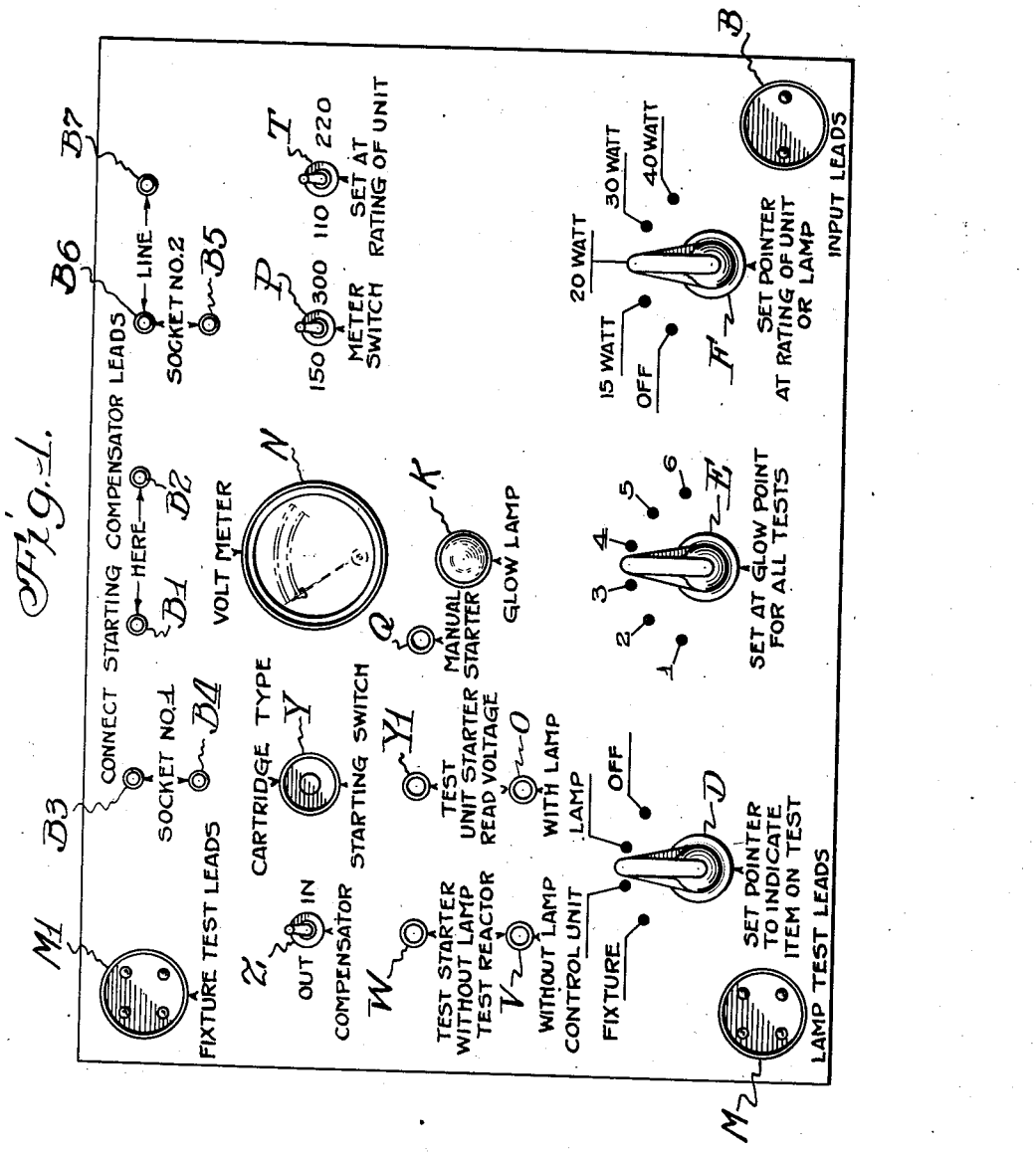

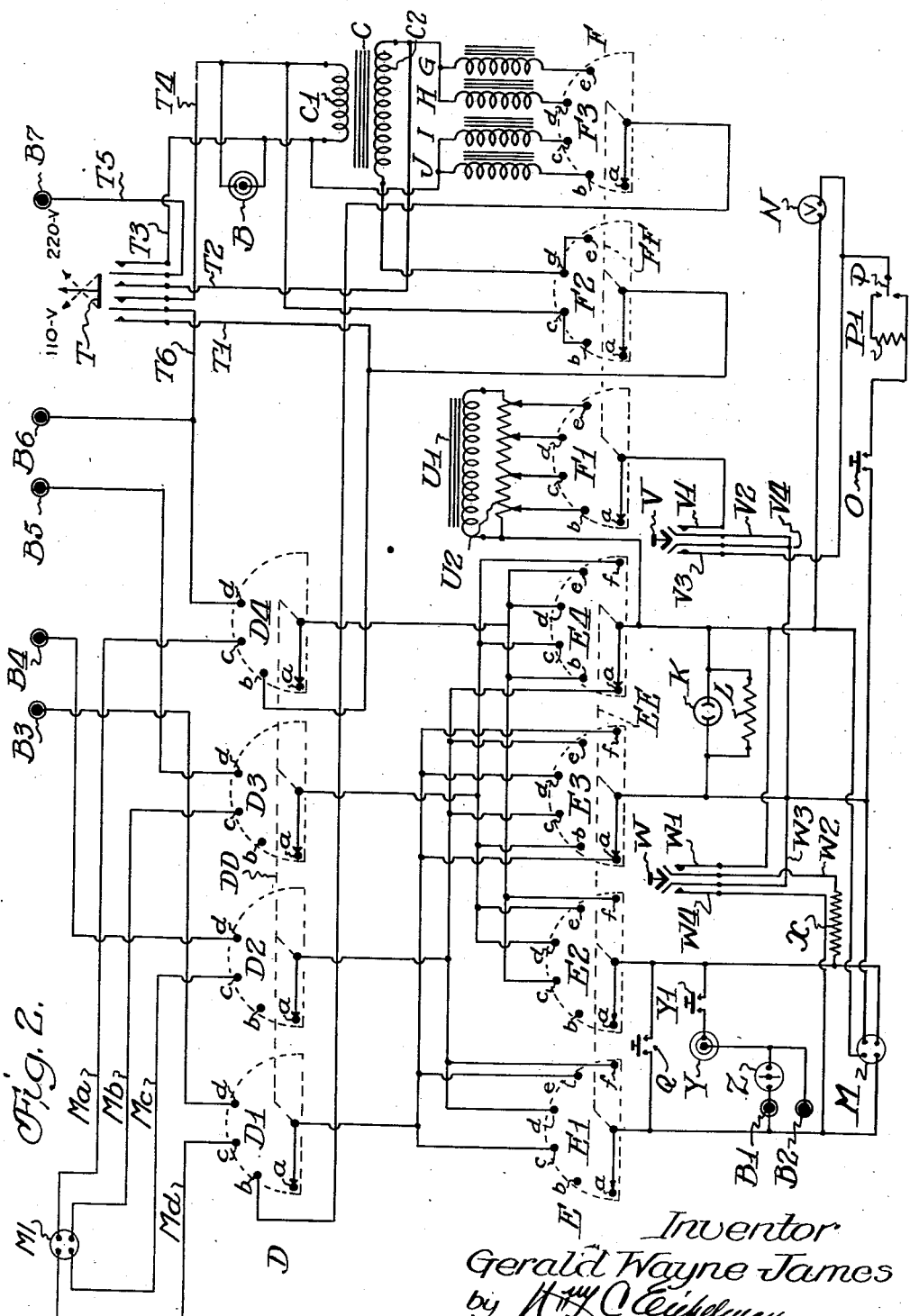

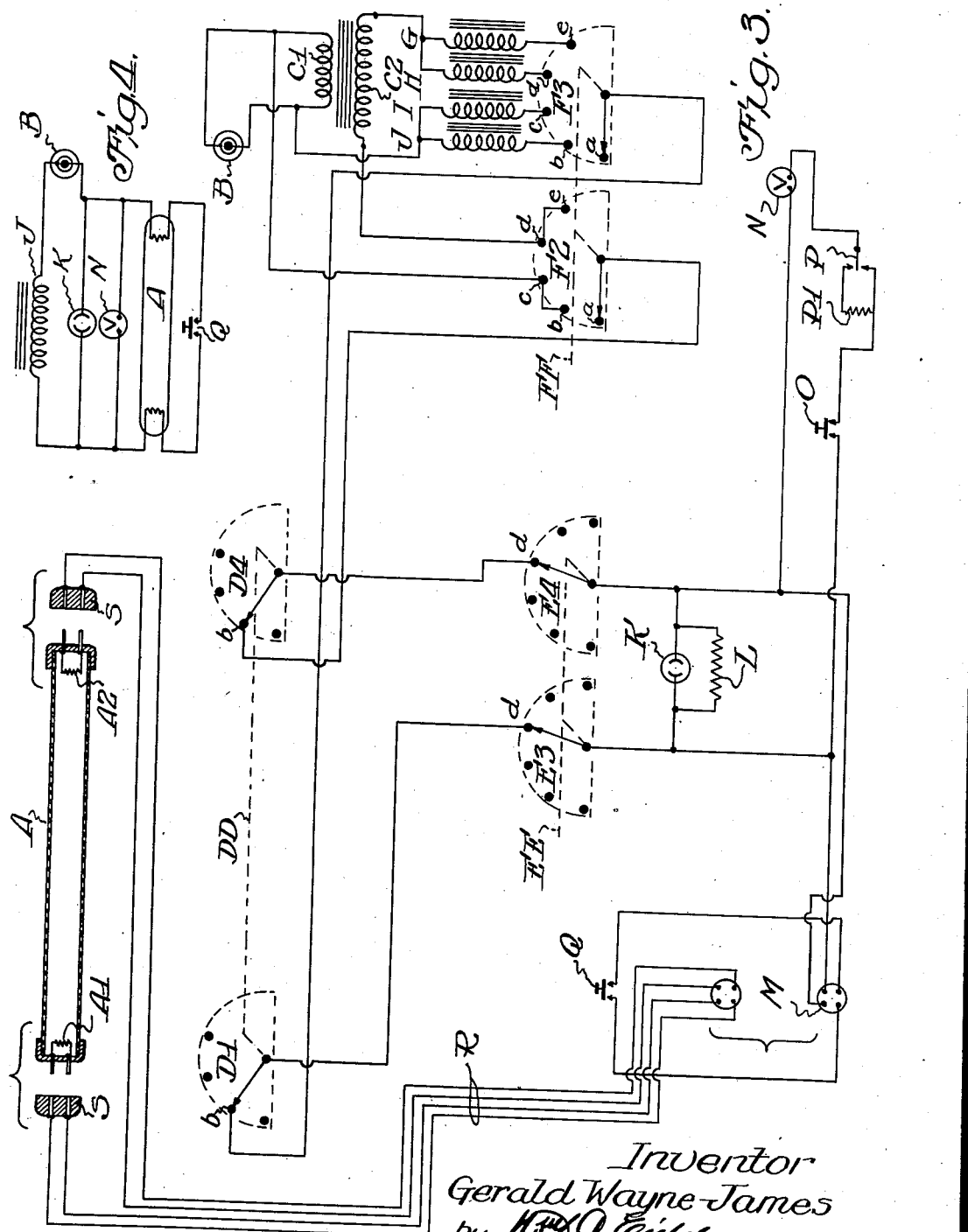

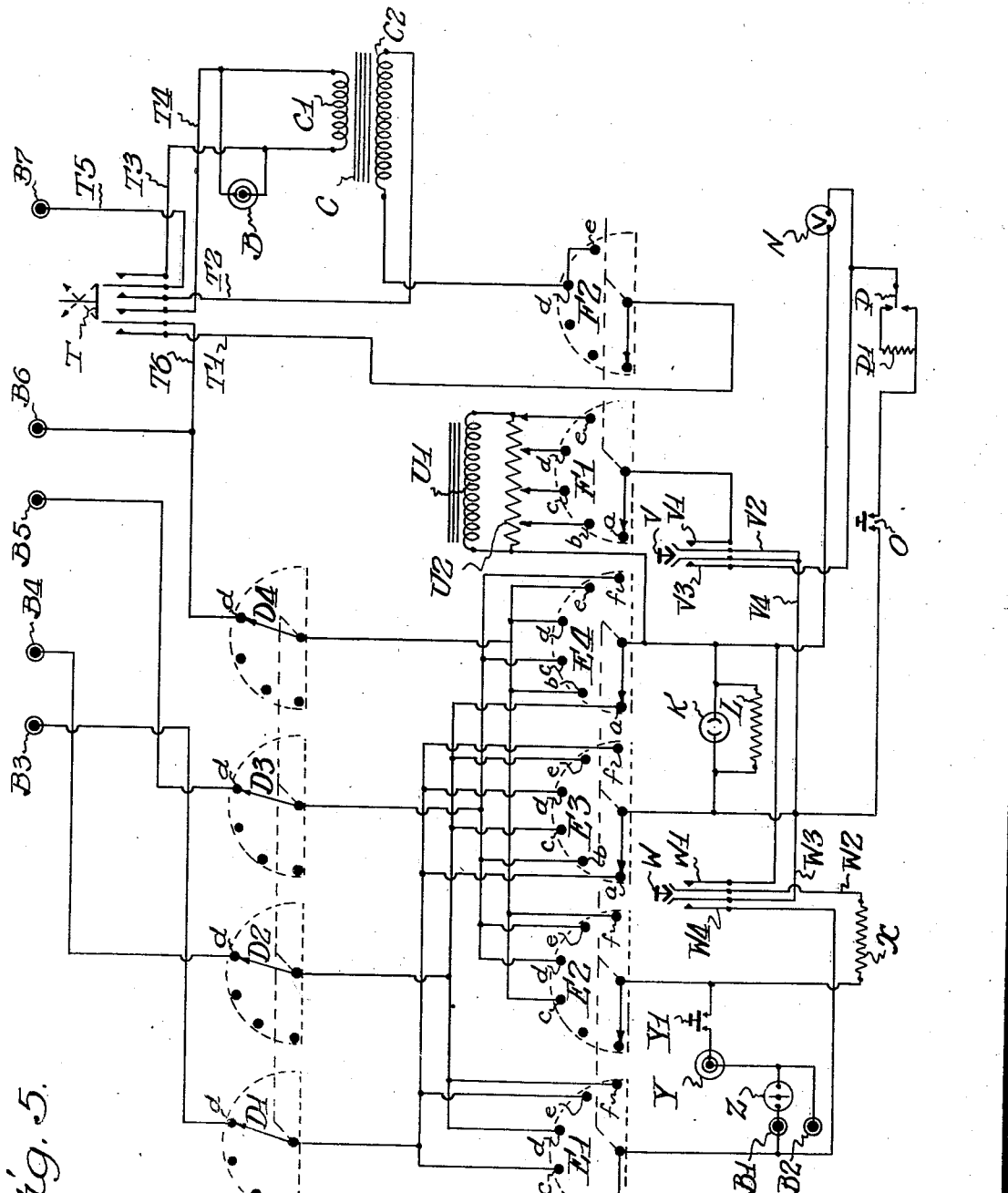

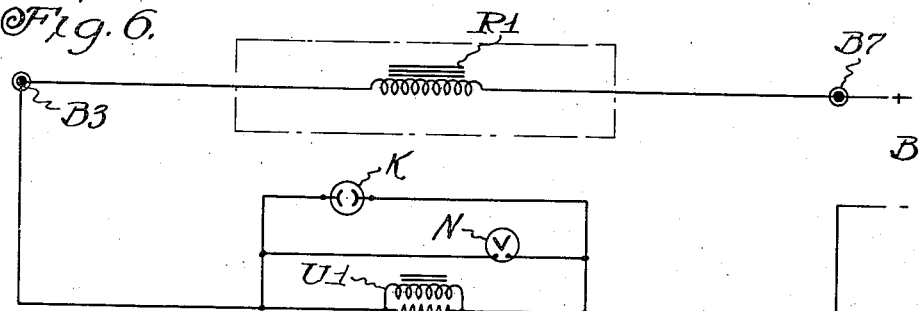
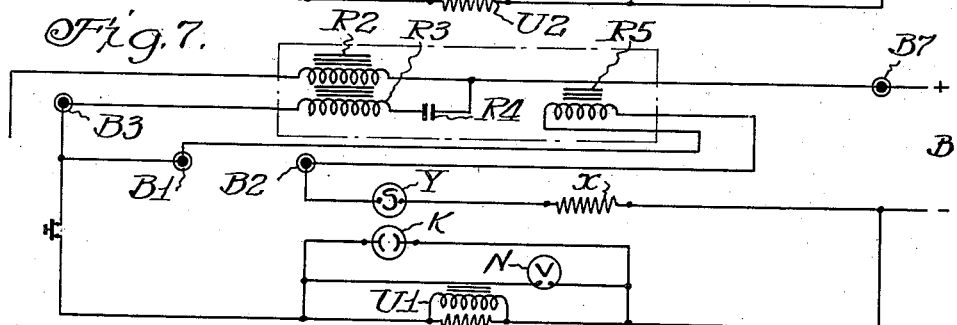
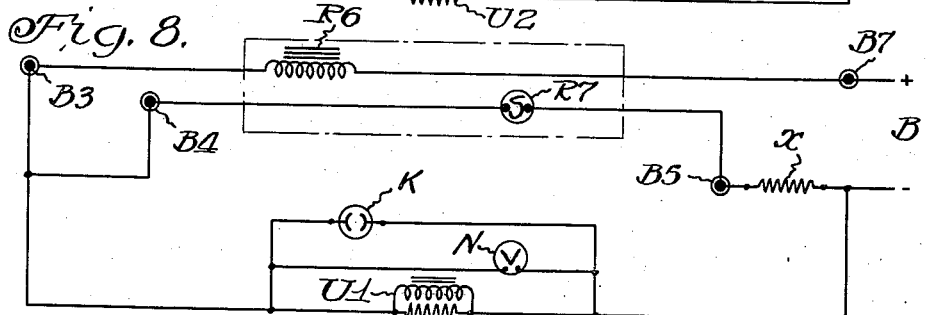
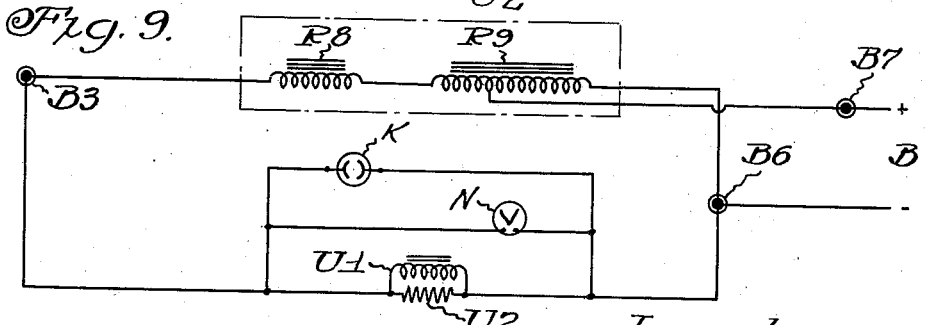

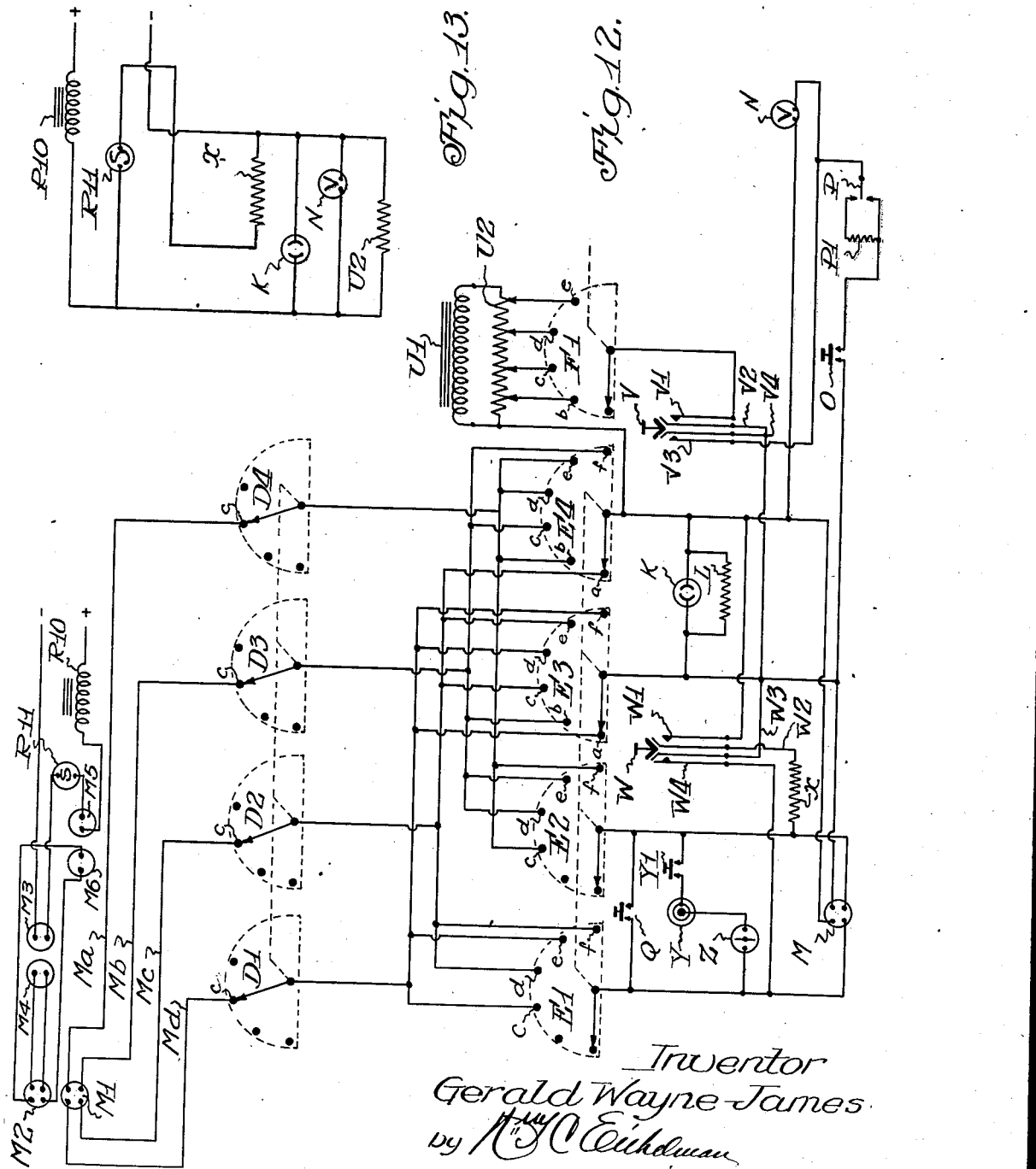

May 27, 1941.  G. W. JAMES  2,243,755
APPARATUS FOR TESTING FLUORESCENT LAMPS, CONTROL UNITS, AND CIRCUITS
Filed July 13, 1940  8 Sheets-Sheet 8

Fig. 14

Inventor
Gerald Wayne James
by [signature]
His Attorney.

Patented May 27, 1941

2,243,755

UNITED STATES PATENT OFFICE 2,243,755

APPARATUS FOR TESTING FLUORESCENT LAMPS, CONTROL UNITS, AND CIRCUITS

Gerald Wayne James, Chicago, Ill., assignor to Zephyr-Lite Mfg. Co., Chicago, Ill., a corporation of Illinois Application July 13, 1940, Serial No. 345,365

11 Claims. (Cl. 175—183)

My invention relates to electrical lighting, and particularly to an apparatus for testing the various control units, circuits, and lamps employed in the present form of fluorescent lighting, and more specifically to a portable type of testing unit embodying the equipment necessary to test the lamps, control unit and circuits, either as independent units or in various combinations thereof, and either when assembled or installed in the fixtures or when dis-assembled and prior to installation.

Present day fluorescent lighting circuits involve a variety of sizes of lamps, each with a different voltage and current requirement, a multitude of controlling and starting devices, and many different circuit combinations, all of which require checking and testing, both prior to and after installation.

It is therefore an object of my invention to provide a portable unit suitably adaptable to test the many varieties of lamps, the various controls and circuits both prior to and after installation and fixture assemblies; a unit which is portable and readily usable in the field for determining trouble encountered in wired circuits, without the risk of destroying lamps or other equipment; a unit which will give an accurate and positive indication when all the circuit components are correct for the operation of the lamp; a unit which will give a varying negative indication when circuit components are not correct for lamp operation; a unit which will indicate when the complete installation is not properly made due to incorrect wiring, the use of the wrong control unit or defective equipment such as the reacter, choke coil, condenser or starting switch.

Further objects of my invention are to provide a unit tester which is simple in design and construction, efficient, easy to operate, accurate, educational and a profitable investment for the electrical contractor, wireman, service-man, engineer, or laboratory technician in his every-day routine work of testing fluorescent lamps, wired circuits and control apparatus such as reacters or choke coils, auxiliaries, ballasts, valves, or compensators, and starting switches (neon, thermal or magnetic), either cartridge and plug in type or the enclosed and built in type.

My present invention has these and other objects, all of which are explained in detail and may be more readily understood when read in conjunction with the accompanying drawings (eight sheets) which illustrate a preferred embodiment of my invention, it being manifest that changes and modifications may be resorted to without departure from the spirit of the claims forming a part hereof. And whereas I have so described my invention, it is to be understood that the words I use are words of description and not of limitation, and that similar characters of reference indicate similar parts throughout the several views of the drawings, and wherein:

Fig. 1 is a plan of the panel board, illustrating the various manually controlled switches, meter, glow lamp, sockets and plug-in leads;

Fig. 2 is a schematic circuit diagram of the entire and complete test unit which I employ for determining the operating characteristics of the lamp, fixture, and control units as usually used in fluorescent lighting;

Fig. 3 is a schematic circuit diagram—a part of Fig. 2—showing that portion employed in the testing of the lamp only;

Fig. 4 is a simplified and condensed diagram of Fig. 3;

Fig. 5 is the schematic circuit diagram—a part of Fig. 2—showing that portion only of the general circuit employed in testing control units, such as reacters comprising the various combinations, such as shown at Figs. 6 to 9 inclusive;

Fig. 6 illustrates a simple form of single lamp, 110 volt reacter or impedance for use with an external starting switch for a 15 and 20 watt lamp shown connected in the circuit of Fig. 5 shown in simplified form;

Fig. 7 like Fig. 6 illustrates a two lamp, 15 or 20 watt, 110–125 volt reacter or ballast, with built in starting compensator for use with external starting switch;

Fig. 8 further illustrates a simple 15 or 20 watt single lamp reacter with built in starting switch;

Fig. 9 is a like schematic diagram of a 30 or 40 watt single lamp reacter, 110–125 volts, for use with an external starting switch shown connected in the circuit of Fig. 5 as before;

Fig. 10 is a schematic diagram of that portion of Fig. 2 employed in the testing of starting switches;

Fig. 11 is a simplification of Fig. 10;

Fig. 12 is a schematic diagram of that portion of Fig. 2 used in the testing of the control units after assembly in the lighting fixture, and includes the connections to the fixture;

Fig. 13 is a simplified diagram of Fig. 12; and

Fig. 14 is a schematic diagram of a like but modified form of unit employed in testing the control units such as the reacter and starting switch subsequent to their complete assembly in and to the lighting fixture.

Referring particularly to Fig. 1 and Fig. 2 of the drawings, there is here shown a series of inter-connected circuits for quickly and accurately determining the characteristics of the fluorescent lamp, its circuit, and its control apparatus, which for purpose of clearness and description I now separate and catalogue its functions as follows:

I

When auxiliary power is supplied to the test kit which embodies the circuit shown at Fig. 2, independently of the source of power supplied to the fixture, I am enabled to:

(a) Test fluorescent lamp of the low voltage or Mazda type.

(b) Test reacter or control equipment variously known as auxiliaries, ballasts, choke coils, valves or compensators.

(c) Test starting switch, which may be of the thermal type, magnetic type, or cartridge or plug-in type sometimes referred to as a neon glow switch, which in reality is usually a thermal type employing a neon or other gas filled tube for the heating element in lieu of the usual coil. The starting switch may be tested either in combination with the reacter, such as where the starting switch is built in and enclosed and made a part of the control equipment per se, or the starting switch may be tested separately and alone as in the case of the cartridge or plug-in type.

II

When power is supplied directly to the installed fixture and no auxiliary power is supplied to the test equipment, I may:

(a) Test lamp individually.
(b) Test reacter individually.
(c) Test starting switch individually.
(d) Test for correctness of fixture wiring.
(e) Test lamp and reacter in combination.
(f) Test reacter and starting switch in combination.
(g) Test lamp, reacter and starting switch in combination.

And as each of the above listed tests is usually separate and distinct from the others, I have illustrated each such circuit separate and apart from the inter-connected circuit of Fig. 2 and now describe each in turn, reference being had to the foregoing.

The specific circuit for testing the fluorescent lamp A is indicated at Fig. 3. This lamp may be of any type of gas filled tube having a suitable cathode A1 and anode A2 which are here shown as independent heating elements. The lamp operates under either direct or alternating current, but tests conducted under paragraph I require the test kit be plugged into 110 volt, alternating current at the socket B which connects to the primary windings C1 of a transformer C. Tests conducted under paragraph II may use either direct or alternating current as the transformer is not employed, but under paragraph I, and by changing the characteristics of the transformer, I am enabled to alter the current to meet the usual requirements as to voltage and cycle.

I now employ three separate selector switches D, E and F which are adjusted by hand by turning the pointer to the desired locations. The switch D is a four (4) gang four position switch, each gang operating from the common shaft D—D and being individually indicated as D1, D2, D3 and D4, and each gang has the positions a, b, c and d adapted to be engaged by a sliding contact arm common to each gang and independent electrically from all others, as indicated at Fig. 2. The switch E is like in form, being a four (4) gang indicated E1, E2, E3 and E4, with six (6) positions a, b, c, d, e and f on each gang. And switch F is also like both D and E except that it has three (3) gangs with five positions each, a, b, c, d and e respectively.

In the circuit of Fig. 3, positions b and c of switch F2 are connected to one side of the power circuit from the plug B, while positions d and e are connected to one side of the secondary winding C2 of transformer C, the opposite side whereof connects to one end of a choke coil or inductance member G, the opposite side whereof connects to position e on F3. A like inductance H, is also connected between the same side of the transformer secondary winding C2 and the position d on F3, while positions b and c on F3 are each in turn connected through inductances I and J direct to one side of the power circuit from the plug B opposite to that connecting positions b and c of F2. In passing, I wish to mention that a tapped choke may be most successfully used as an alternate and in lieu of the separate inductances G and J. A neon glow lamp K is shunted across the contact arms E3 and E4, which has a resistance L placed across its terminals to reduce leakage which otherwise would be apparent, and the contact arms E and F are connected respectively, to two points of a four post socket M; a voltmeter N is shunted across these connections, one side of the line connecting in series a push button switch O and a two pole, single throw switch P with resistance P1, for changing over the voltmeter as will be hereinafter described. A second push button type switch Q is connected across the remaining two terminals of the socket M as shown.

The operation of the circuit shown at Figs. 3 and 4 will now be described as relating to the testing of a 110 volt 15 watt lamp. The pointer on switch D is set to the position indicated on the panel as "Lamp" which places the contact arms on position b of both D1 and D4. Power is next plugged into socket B, 110 volts, 60 cycle. The pointer on switch F is then set to correspond to the wattage of the lamp under test, which in this case is "15 watt" which places the contact arms on the position b of both F2 and F3. The switch E is next adjusted until the lamp K and the inductance J are in series, which causes the lamp K to light, which indicates completion of the circuit. A set of four (2 pair) lamp test leads R are then plugged into the socket M, the opposite end of each pair terminating in a socket S which is adapted to engage the terminals of the lamp A in assembly. When this is done, the push button switch Q is closed momentarily, which closes the circuit across each end of the lamp, causing the heating elements A1 and A2 to glow and the lamp to light, thus manually duplicating the action of the usual starter switch. To check the line voltage, the lamp A is removed from the sockets S—S and the push button switch O is closed which cuts in the voltmeter N directly across the line from the socket B.

When a 20 watt lamp is tested, the pointer on the switch F is moved to the position indicated as "20 watt" thus throwing in the inductance I which is of the proper characteristics for a 20 watt lamp; otherwise the procedure is the same as for the 15 watt lamp.

For testing a 30 watt lamp, which usually requires 220 volts in place of 110 as heretofore, the pointer on F is adjusted to the position indicated as "30 watt" which places the contact arms on F2 and F3 in d position, so that the power instead of passing directly from the socket B as before, now is directed through the transformer C, which here is given a 2 to 1 ratio, so that the secondary C2 supplies the power at 220 volts through the inductance H; otherwise the operation is the same as before described. And for a 40 watt lamp the inductance G is cut in, and the test carried out as heretofore. From the foregoing, it will be apparent that in testing the lamp A, having a cathode A1 and anode A2, I first provide a source of current to the plug B, which is adapted to pass, either as 110 or 220 volts, through the transformer C, through one portion of the variable impedance and inductive reactance G to J and through the lamp A in series, the rotary members of the gang switch F2 and F3 serving as a manually controlled means for mechanically synchronizing the selection of both the impedance and the required voltage for the particular characteristics of the lamp under test, and that to obtain an indication of the lamp operation, I connect current responsive means, such as the voltmeter N and the glow lamp K across the electrodes A1 and A2 of the lamp, and that further, the momentary closing of the switch Q cuts in that impedance G to J which has previously been set up as a compensating reactance across each cathode which momentarily serves as heating coils, and takes the place of the usual automatic type starting switch.

In order to test control units such as reactors, including various forms of impedance, and to determine if too much or too little current will be allowed to flow through the lamp, and to check either external or internal shorts, I deal with the effect produced, and not the cause. Figs. 2 and 5 show the circuits I prefer to use for this purpose, Fig. 5 being only a portion of Fig. 2 will be used as more clearly illustrating the principles involved.

The number of control units now available and the variety of circuits in common use today are so large that it is here impractical to discuss more than just a few in detail, and to describe the application of my test unit to these few only, it being manifest that many others are equally applicable to the tests as are hereinafter described. And various manufacturers employ different methods of bringing out leads and color codes and markings which may not be universally the same. In Fig. 5, I show the seven binding posts upon the panel which are designated by the reference characters B1, B2, B3, B4, B5, B6 and B7, and to which the various leads from the control unit to be tested are connected.

The binding posts B1 and B2 are universally employed for connecting a starting compensator into the test circuit, while B6 and B7 connect direct through T6 and T5, through the double pole double throw toggle switch T, either to 110 volts through T3 and T4; or in the alternate position, through T1 and T2, through the secondary C2 of the transformer C, thus putting 220 volts across the line. As a safety factor, the connection of T1 and T2, through the secondary of the transformer is controlled by the switch F2, whereon the positions d and e, as before described are indicated on the dial as "30 watt" and "40 watt" respectively, and the circuit cannot be closed without first putting the switch F2 in either one of these two positions. A fixed, or constant inductance U1 is connected in parallel with a variable resistance U2, whose taps lead direct to positions a to e inclusive on the switch F1. One side of both the inductance and the resistance connects to the contact arm of E4, and the contact arm of F1 connects to V1 of the double pole single throw push button type switch V, contacts V2 and V4, whereof, connect in common to contact arm of switch E3; a voltmeter N is connected across the contact arms of switches E3 and E4, through the switch V, or through the switch O, and a single pole double throw switch P cuts resistance P1 into the volt meter circuit to change dial readings in the usual manner. The neon glow lamp K also connects across the arms of E3 and E4, and has a fixed resistance L placed across its terminals to absorb stray voltage or leakage as is customarily done. A switch W, like V, is likewise connected across E3 and E4, and E1 and E2, the connection W2 whereof leads through a fixed resistance X to E2 and W4 through the binding post B1 and E1. A socket Y of the type adapted to receive the plug-in type of cartridge starting switch is connected across the binding post B2 and the contact arm of the switch E2 through a push button switch Y1. The binding post B1 is connected on one side to the contact arm of E1, and on the other through a snap switch Z to the binding post B2. The binding post B3 connects to position d on D1; the post B4 to position d of D2; the post B5 to position d of D3; and the post B6 to position d of D4. The four contact arms of the selector switch D connect to the respective positions on the selector switch E as follows: D1 to c and e on E1, and a, d and f of E3; D2 to d and f of E1, c and e of E3, and a of E4; D3 to d and e of E2, b of E3, and c and f of E4; and D4 to c and f of E2, and b, d and e of E4.

Particular reference to Fig. 5 is here made because Figs. 6 to 9 inclusive each include a simplified drawing of the circuit shown at Fig. 5.

I will now describe the operation of testing a 110–125 volt 15 or 20 watt reacter for use with external starting switch as shown at R1. Fig. 6 of the drawings. A source of power, 110 volts, is plugged into socket B and switch T set at "110 volts." Selector switch F is set at the position indicated on the panel to correspond to the marked unit rating, which in this case will be either "15 watt" or "20 watt" which places the contact arm on F2 to either b or c position, which does not cut in the secondary of the transformer but permits only 110 volts across the line, which is the required voltage characteristic for lamps of this rating. The setting of the dial on switch F also cuts in a portion of the variable resistance U2 and the fixed inductance U1 in series with the impedance R1 of the reactor under test, by first closing the circuit through the switches D and E, and connecting the leads from the reacter under test to the binding posts B3 and B7 as indicated at Fig. 6. Current responsive means such as the voltmeter N and the glow lamp K are connected across the reactor circuit by their respective switches as before described. In closing the circuit through the selector switch E, the dial is rotated until upon contact the glow lamp lights. The lamp must light in one position only and not upon either position a or b, otherwise the unit under test is not correct as to capacity or otherwise defective.

The control units under test are usually completely enclosed as indicated in broken lines in Figs. 6 to 9, and have marked leads for connection into the circuit, such as indicated at Fig. 7, wherein the control unit is adapted for use with two lamps of 15 or 20 watt, 110–125 volts. The starting compensator R5 is built in for use with an external starting switch Y. One lamp circuit has the impedance R2, and the other has a similar impedance R3 and condenser R4 in series. Each lamp circuit or reactor is tested individually. One lead from R2 connects to the binding post B7, and the other through the binding post B3, resistance U2 to the other side of the line, while the compensator leads connect to B1 and B2, which also cuts the starting switch Y and the resistance X in series with the line, from where the test proceeds as before.

Fig. 8 illustrates another common type of control unit properly hooked up for test and wherein a single impedance R6 is provided with a built-in starting switch R7. As before, the leads from the impedance R6 are connected respectively to the posts B3 and B7, but the leads from the starting switch R7 are connected to B4 and B5 as shown, which puts the fixed resistance X in series through the switch W (see Fig. 5) with the starting switch R7 and the inductance R6. The test then proceeds as heretofore described.

I have further illustrated by Fig. 9, a control unit comprising the usual impedance R8 connected in series with the secondary of a transformer R9, the leads whereof are connected to B3 and B6, and the primary to B7 as shown, so that the primary circuit is in series with the line through the posts B7 and B3, and the secondary circuit is in series with the line through the posts B6 and B3, so that independent tests of each may be conducted as before described.

There are many other control units on the market today embodying various combinations of the general run as just shown and described, but their specific inclusion herein is not deemed necessary, as it is believed most evident that the examples given are indicative of the flexibility of my testing apparatus and amply illustrate its range of possibilities.

Starting switches of the external type, that is, those not already built into the control unit, are often times defective and require checking. These are usually of the plug-in or automatic type, and comprise a gas filled tube containing an anode and bi-metal cathode, which close the circuit upon heating and open upon cooling, although many of the other types including those employing heating coils are equally adaptable to test. For this purpose I employ the circuit illustrated at Figs. 10 and 11, and where, as before, the switch D is set at "control unit", switch F at the known rating, and switch E to a point where the lamp K will glow. The starting switch to be tested is inserted in the socket Y so that the closing of switches W and Z will connect the resistance X in series with the inductive reactance J and the starting switch under test as shown at Fig. 11, and as before, the glow lamp K and volt meter N are connected across this circuit for obtaining an indication of the starter operation.

The foregoing has briefly prescribed the various circuits to be employed in testing the lamp, the control unit, and the starting switch, prior to assembly in the lighting fixture, but many problems and difficulties arise in the field after these units have been installed in the fixtures and the fixtures set or hung in place and sealed in, so that the wiring can no longer be traced without destruction to the installation and its attendant expense. Therefore, my unit has been devised to meet the field requirements for a test of the assembled and installed fixture, the circuit being particularly defined at Figs. 12 and 13, as a part of Fig. 2, and in which case position c on the switches D1, 2, 3 and 4, which is indicated as "Fixture" are connected to the four terminals of the socket M1 at Ma, Mb, Mc and Md, while the contact arms of the switches E1, 2, 3 and 4 connect respectively to the four terminals of the socket M. A pair of two wire leads terminating in the plugs M4 and M6 are plugged into the socket M1, the opposite ends whereof are adapted, respectively, to plug into the fixture sockets M3 and M5 as shown upon removal of the lamp from its sockets. The installed reacter and starting switch are indicated as R10 and R11 respectively in the simplified schematic diagram of Fig. 13, where the power for testing purposes is also indicated as supplied by the fixture per se. And now as before, the switch F is moved to the indicated rating of the fixture, and the switch D to position c indicated as "Fixture" on the panel while the switch E is rotated to a position upon which the lamp K will glow. In this case in particular the switch E is truly a selector in that the operator, by its use, is enabled to pick out a combination on E which will match any usual wiring of the fixture. For example, if the lamp K lights on position a, it means that the line and the reactor are in series with the two terminals at one end only of the lamp fixture—this designates improper wiring; and should the lamp light on position b, the same condition prevails only at the opposite end or opposing lamp fixture. In wiring the fixture, the leads may become transposed, or in fitting the test plug the operator may or may not plug in to establish a circuit as shown, and Ma may become Mb or Md, or Md may become Mc, or (Ma and Mb) and become (Md and Me). The switch E is specifically provided to meet a change in polarity or position. To illustrate, assume we substitute position Ma with Mc; position Mb with Ma; and Mc with Md. Then the switch E is adjusted until the glow lamp lights, which in this case will be on position c, which indicates an operable circuit. And as before, the switch F1 cuts in a portion of the variable resistance U2 and the fixed inductance U1 which is connected in series with the reacter R10 under test, and the closing of the switch W places the resistance X in series with the starting switch R11, all as previously described, with the volt meter and glow lamp shunted across each circuit for obtaining an indication of their respective operations. Further, the fluorescent lamp to be used in the fixture under test may also be tested individually, using the power taken from the fixture and following the details as before given.

For a field test kit only, I have provided a simplified test circuit as illustrated at Fig. 14, and wherein a two gang, six position rotary type switch E5 and E6 performs the same functions as the switch E1, 2, 3 and 4 of Fig. 12, and a double pole, double throw switch Fa corresponds to switch F1, a single pole double throw switch Wa corresponds to switch W, a single pole single throw switch O1 to switch O, and a single pole double throw switch Va to switch V. A fixed inductance 1U1 with a variable resistance 1U2 are connected in parallel across the test circuit for the reacter R12 through the switch Fa while a fixed resistance IX is connected in series with the fixture starting switch R13 as before, and current responsive means such as the volt meter N1 and glow lamp IK are likewise connected across both the reactor circuit and the starting switch circuit to obtain an indication of their respective operations. Binding posts M*e*, M*f*, M*g* and M*h* are provided in lieu of the fixture test socket M1, to which the wires M*i*, M*j*, M*k* and M*l* leading from the socket M7 are adapted to connect, and the plug M8 for the socket M7 carries two pair of two wire leads terminating in the plugs M4 and M6, adapted, respectively, to plug into the fixture sockets M3 and M5 for the purposes and of like effect as before described, and so that the reactor R12 which is under test, may be connected in series with a portion of the variable resistance IU2 and the fixed inductance IU1, and the starting switch R13 which is under test may be connected in series with the fixed resistance IX.

Having thus described my invention, what I claim is:

1. In combination, a testing circuit including current responsive equipment under test, a source of current for said circuit, manually operable means for controlling the connection of the equipment under test into said circuit, said means comprising a selector switch having a number of contact terminals and a plurality of contact arms adapted to be moved into engagement with the respective terminals, each arm being mechanically synchronized with the other to concurrently contact separate terminals to close the circuit, a fixed inductance and a variable resistance connected in parallel, a transformer, manually operable means for connecting portions only of said variable resistance into the circuit mechanically synchronized with means for coupling alternate sides of said transformer into the circuit to concurrently correspond to the characteristics of the equipment under test, a fixed resistance, means for cutting out of said circuit said fixed inductance and said variable resistance and cutting in said fixed resistance in series in said circuit, a variable impedance and inductive reactance, manually operable means for connecting portions only of said variable impedance into the circuit mechanically synchronized with said means for coupling alternate sides of said transformer into the circuit, and current responsive means connected across said circuit for obtaining an indication of the operation of the equipment under test.

2. In combinaion, a testing circuit including current responsive equipment under test, a source of current for said circuit, means for controlling the connection of the equipment under test into said circuit, a fixed inductance and a variable resistance connected in parallel, a transformer, means for connecting portions only of said variable resistance into the circuit, means for coupling alternate sides of said transformer into the circuit, a fixed resistance, means for cutting said fixed inductance and said variable resistance out of said circuit and cutting in said fixed resistance, a variable impedance and inductive reactance, means for connecting portions only of said variable impedance into the circuit, and current responsive means connected across said circuit for obtaining an indication of the operation of the equipment under test.

3. The combination with a testing circuit as per claim 1, which includes a current-actuated starting switch coupled and responsive to the flow of current in said circuit.

4. In an apparatus for testing current responsive equipment, a space discharge device having cathode and anode electrodes associated therewith, a testing circuit including said device in series with a source of current, a variable impedance and inductive reactance, a transformer, means for connecting portions only of said variable impedance into said circuit in series with said device, means for introducing alternate sides of said transformer into the circuit, means for momentarily throwing the current across the respective cathode and anode of the device, and current responsive means connected across said circuit for obtaining an indication of the operation of said device.

5. Testing apparatus as per claim 4, wherein the means for connecting portions only of said variable impedance into the circuit is synchronized with the means for coupling alternate sides of the transformer into the circuit to concurrently correspond to the characteristics of the device.

6. In an apparatus for testing current responsive equipment, an impedance, a testing circuit including said impedance in series with a source of current, a fixed inductance and a variable resistance connected in parallel, a transformer, means for connecting portions only of said variable resistance into the circuit, means for coupling alternate sides of said transformer into the circuit, and current responsive means connected across said circuit for obtaining an indication of the operation of said impedance.

7. Testing apparatus as per claim 6, wherein the means for connecting portions only of said variable resistance into the circuit is synchronized with the means for coupling alternate sides of the transformer into the circuit to concurrently correspond to the characteristics of the impedance.

8. Testing apparatus as per claim 6, which includes a current-actuated starting switch coupled and responsive to the flow of current in said circuit.

9. In an apparatus for testing current responsive equipment, a current-actuated starting switch, a testing circuit including said starting switch in series with a source of current, a fixed resistance, a variable impedance and capacitative reactance, a transformer, means for connecting portions only of said variable impedance into the circuit, in series with said fixed resistance, means for coupling alternate sides of said transformer into the circuit, and current responsive means connected across said circuit for obtaining an indication of the operation of said current-actuated starting switch.

10. Testing apparatus as per claim 9, wherein the means for connecting portions only of said variable impedance into the circuit is synchronized with the means for coupling alternate sides of the transformer into the circuit to concurrently correspond to the characteristics of the starting switch.

11. In an apparatus for testing current responsive equipment, an impedance and a current-actuated starting switch coupled and responsive to the flow of current through the impedance, a testing circuit including said impedance and said starting switch in series with a source of current, a fixed resistance, a fixed inductance and a variable resistance connected in parallel, means for connecting portions only of said variable resistance and said fixed resistance into the circuit, manually operable means for controlling the connection of the combined impedance and starting switch into said circuit, said means comprising a selector switch having a number of contact terminals and a plurality of contact arms adapted to be moved into engagement with the respective terminals, each arm being mechanically synchronized with the other to concurrently contact separate terminals to close the circuit, and current responsive means connected across said circuit for obtaining an indication of the operation of said impedance and said starting switch.

GERALD WAYNE JAMES.